July 4, 1950   C. L. WERNER   2,513,609
MACHINE FOR MAKING CANDY SUCKERS
Filed July 25, 1946   4 Sheets-Sheet 1

INVENTOR.
Charles L. Werner
BY
Frank Keifer

July 4, 1950 C. L. WERNER 2,513,609
MACHINE FOR MAKING CANDY SUCKERS
Filed July 25, 1946 4 Sheets-Sheet 2

INVENTOR.
Charles L. Werner
BY
Frank Keiper

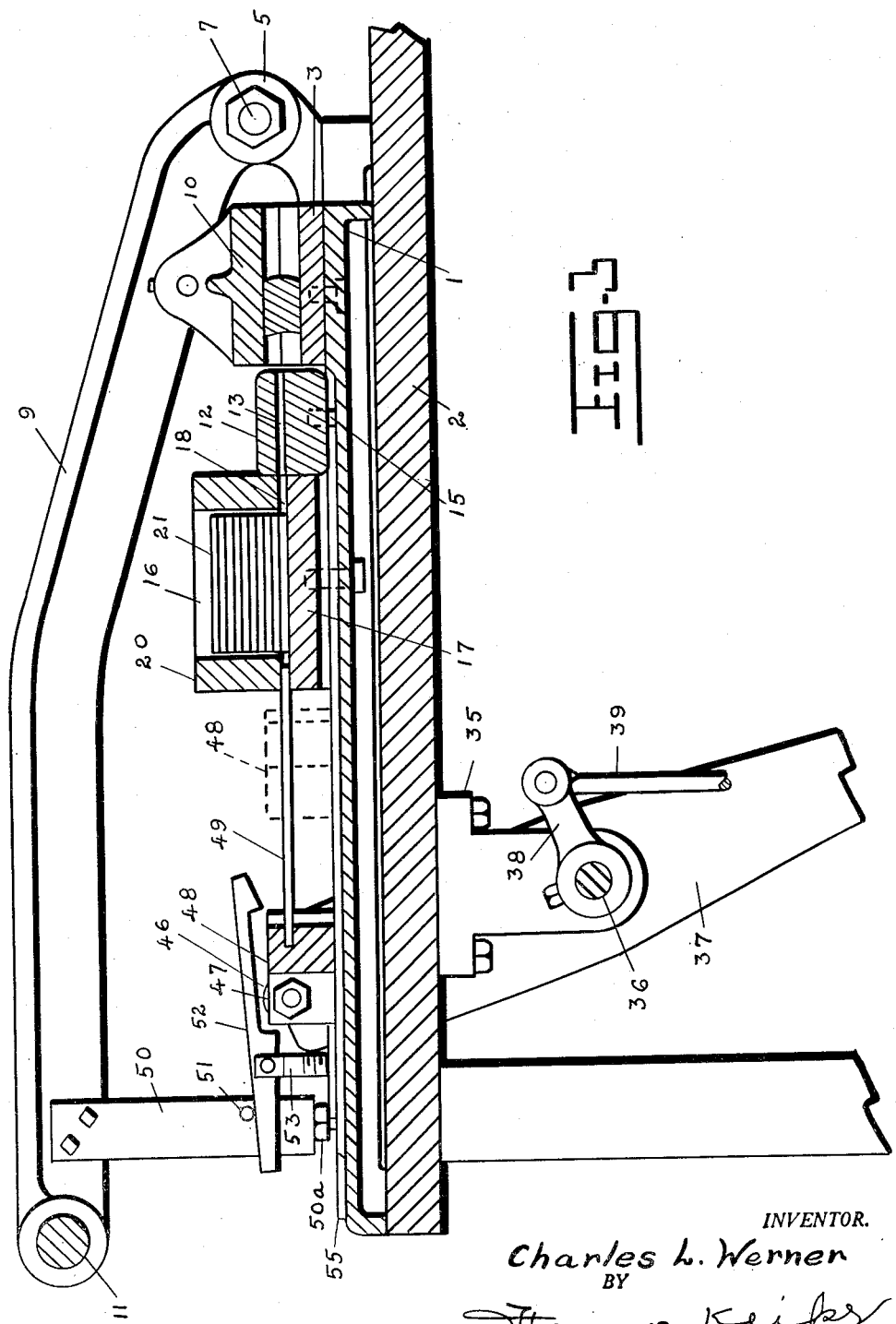

July 4, 1950            C. L. WERNER            2,513,609
MACHINE FOR MAKING CANDY SUCKERS
Filed July 25, 1946            4 Sheets-Sheet 4
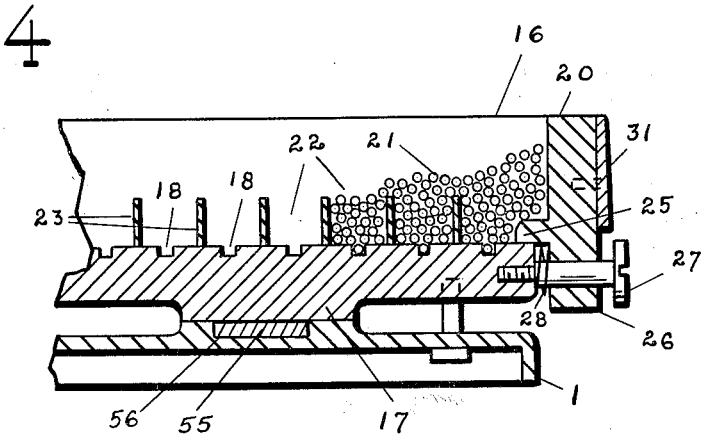
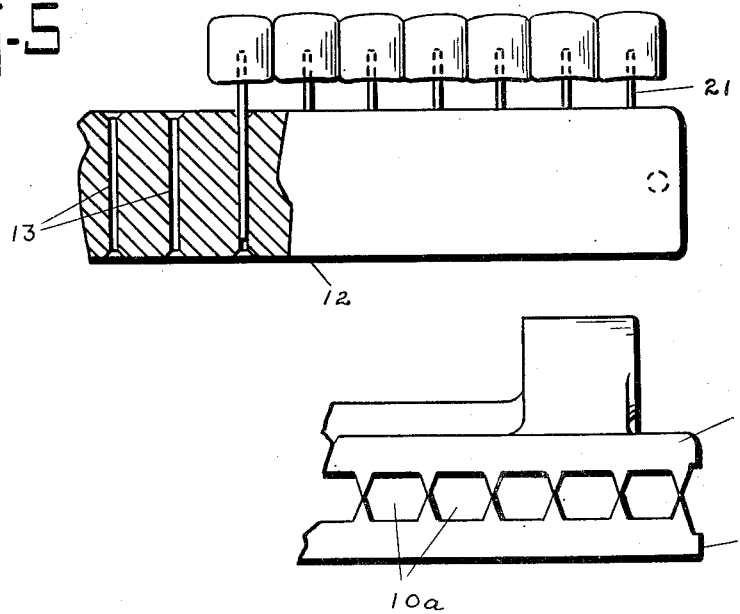
INVENTOR.
Charles L. Werner
BY
Frank Keefer Patented July 4, 1950

2,513,609

UNITED STATES PATENT OFFICE 2,513,609

MACHINE FOR MAKING CANDY SUCKERS

Charles L. Werner, Rochester, N. Y., assignor to John Werner & Sons, Inc., Rochester, N. Y., a corporation of New York Application July 25, 1946, Serial No. 686,195

8 Claims. (Cl. 107—8)

In the candy trade, so-called suckers are made and sold usually for a low price. These suckers consist of a lump of candy weighing possibly one-half ounce or more, carried on the end of a short stick. These suckers are now made by automatic machines in the factories and are sold at wholesale to the retail trade.

The object of this invention is to provide a machine or apparatus on which these suckers can be made in large quantities at low cost by the retailer.

Another object of the invention is to provide a machine that can be operated by one or two men.

Another object of the invention is to provide a machine into which a strip of plastic candy can be pulled intermittently from a large batch, the machine operating to cut each strip into a number of suckers at the same time combining a stick with each sucker.

Another object of the invention is to provide a machine with which this operation can go on continuously until the batch is used up or made into suckers.

These and other objects of the invention will be illustrated in the drawings, described in the specification and pointed out in the claims at the end thereof.

In the drawings:

Figure 3 shows the machine in section, the section being taken on the line 3x, 3x of Figure 1 and is shown on an enlarged scale.

Figure 4 is a vertical section taken on the line 4x, 4x of Figure 2, showing the hopper broken partly away which hopper holds the sticks that are inserted into the suckers after they are molded.

Figure 5 is a plan view of the end portion of the pick-up bar which bar holds and guides the sticks when the sticks are pushed into the soft candy and which bar is lifted to remove the finished suckers from the machine. The finished suckers and sticks are easily shaken out from this bar.

Figure 6 is a side elevation of the two dies when the dies are brought together and viewed from the left as shown in Figure 2, the dies being shown partly broken away.

In the drawings like reference numerals indicate like parts.

Figure 1:
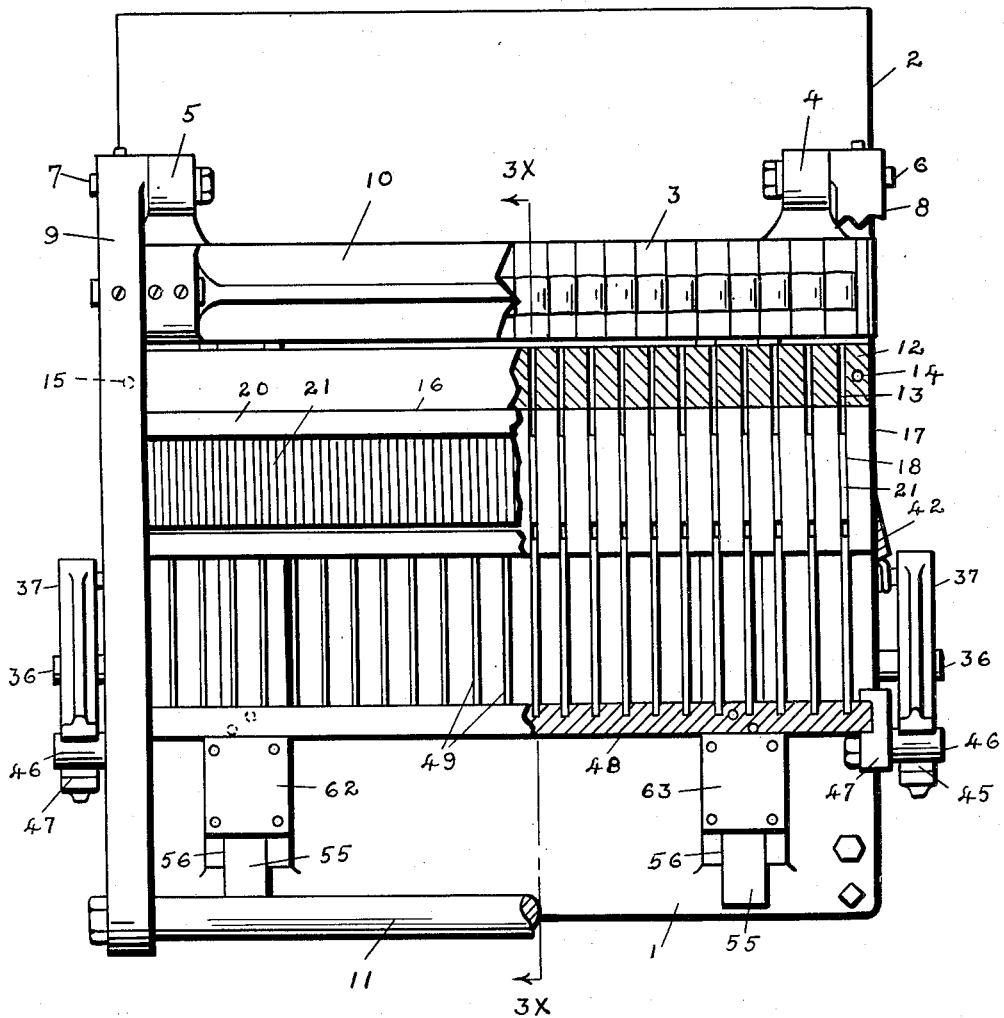
Fig. 1 is a top plan view of the machine, a portion of the right half of the machine being broken away to expose that part of the machine that is on a lower level.

In the drawings, the machine comprises a bed 1, which bed is made preferably of cast iron. This bed is fastened to a table 2. On this bed is carried the lower half 3 of the die. Integral with the lower half of the die are the bosses 4 and 5. In these bosses are carried pivot pins 6 and 7 on which swings the arms 8 and 9. These arms carry the upper part 10 of the die which cooperates with the lower part 3 for the purpose of molding the candy part of the sucker in a plurality of molds formed in the dies. The two arms 8 and 9 are joined together at the front by a cross bar 11. As this cross bar is raised the upper part 10 of the die is raised and when the cross bar is lowered the upper part 10 of the die is brought down on the lower part of the die 3 for the purpose of molding a series of suckers in the dies. Each of these dies is divided into a series of pockets. When the dies are brought together a pocket of the upper die and a pocket of the lower die come together to form one mold for one candy sucker.

Assembled on the bed 1 from right to left as shown in Figure 3 is a series of parts as follows: namely, the pick-up bar 12, the hopper 16, the bar 48 and the push rods 49 attached thereto.

Adjacent to the dies 3 and 10 is the pickup bar 12 which has a series of holes 13 bored therethrough as shown in Figures 1 and 5. Each of these holes is reamed out a little at each end and each of these holes is located in the bar in line with the axis of each sucker mold 10a from front to back, it being understood that there is one hole 13 for each sucker mold in the dies 3 and 10. This bar 12 is removable from the machine. It sets on two pins 14 and 15 the holes for which are formed in and near the ends of the bar. The pins 14 and 15 are mounted in the base 1.

Adjacent to the pick-up bar 12 to the left thereof as shown in Figure 3 is a hopper 16. This hopper comprises two parts; namely a platen 17 fastened to the base 1 and made preferably of metal. This platen contains a series of parallel grooves 18 therein, each of which grooves is located in line with the axis of its corresponding sucker mold 10a, it being understood as above described that the dies 3 and 10 are divided into a series of sucker molds, twenty or thirty, etc. as the case may be and for each of these molds a groove 18 is provided in the platen 17 and a corresponding hole is provided in the pick-up bar 12. The top part of the hopper 16 is a rectangular box 20, which in length corresponds to the length of one of the sucker sticks plus a little extra for clearance. The hopper has a width that in the aggregate corresponds with the width of the dies 3 and 10, it being understood that the term "length" corresponds to the dimension from left to right in Figure 3 and the term "width" corresponds to the dimension from left to right in Figure 1. For example, we will assume the candy part of the finished sucker is about one inch square and one-half inch thick. The mold for this candy sucker will have a hollow opening therein to correspond. The width of the dies that carries twenty of these molds will be approximately twenty inches or more. Each mold is formed with a hole in line with the axis thereof that permits the stick to enter the mold and engage with the candy sucker.

The sticks 21 which carry the suckers will be any desired length; say four, five or six inches and the holes 13 in the pick-up bar 12 will be a little shorter than four, five or six inches to correspond so that the forward end of the stick will project beyond the pick-up bar and into its mold and into the sucker formed thereon as shown in Figure 5.

Each groove 18 in the platen 17 will be a little longer than the length of the sticks 21.

Referring again to the hopper; this hopper will have a length a little more than the length of the sticks and will be as wide or a little wider than the aggregate width of the twenty or more pockets. The hopper 20 is divided into pockets 22 by partition strips 23 which strips are placed apart between centers a distance corresponding to the width of the molds or the distance between centers of the molds and the distance between the centers of the holes 13 and the distance between centers of the grooves 18, it being understood that the axis of each mold is permanently held in line with the corresponding hole 13 and the corresponding groove 18. Into this hopper is placed a large number of sticks 21 which sticks will fill each of the pockets 22.

In order to feed the sticks it is necessary that each groove 18 shall have a stick in it and to insure this condition a lateral movement of the rectangular box 20 with its partitions is needed for each complete cycle or complete operation of the machine. This lateral movement of the rectangular box 20 must be somewhat more than the diameter of one of the sticks. The lateral movement causes the sticks to straighten out; so to speak, so that they lie parallel to each other in each hopper and parallel to the grooves 18. At some time in this lateral movement a stick will drop into each groove 18 and will therefore be ready to be pushed into the holes 13 of the pick-up bar 12 shown in Figure 5.

One end of the box 20 is shown in section in Figure 4. It is formed with a tongue 25 that rides over the platen 17 and seals the opening between the platen and the end 26 that projects below the platen.

In the platen 17 is carried a pin 27 on which the lower end 26 of the box slides. A spring 28 is provided between the projecting end 26 and the platen so that the box is normally held thereby in the position shown in Figure 4. The box 20 is moved to the left in Figure 4 by the arm 8 when it descends and is moved to the right by the spring 28 when the arm is raised.

This operation will now be described. On the arm 8 is carried a finger or cam 30 which engages with the strike-plate 31 on the box 20 and moves it to the left in Figure 4, compressing the spring 28. When the arm 8 is raised the spring 28 expands or moves the box 20 to the right or to the normal position shown in Figure 4. This insures the filling of each of the grooves 18 with a stick as above described.

Assuming that each of the grooves 18 has received a stick it is necessary to push the sticks endwise out of the grooves and through the holes 13 in the pick-up bar and into the molds in each complete cycle of operations of the machine. For this purpose I have provided a mechanism that will now be described.

On the underside of the table 2 is provided two bearing blocks 35. Between the blocks is pivotally mounted a rock shaft 36. On each end of the shaft as shown in Figure 1 is provided an arm 37. On this shaft 36 is provided a crank 38 by which the shaft and arms 37 are rocked. To this crank 38 is attached a link 39 which is pivotally connected to a foot treadle 40 which is mounted between two bearings 41. To the lower ends of the arms 37 are attached helical springs 42. The opposite end of each of these springs is connected to hooks 43 mounted in the support 44 of the table 2.

At the upper end of each of the arms 37, the arm is bifurcated or forked as shown at 45. Each of these bifurcated ends engage with a roller or pin 46 carried on brackets 47 on the ends of the bar 48. This bar 48 is provided with a series of rods 49 permanently fastened thereto. The forward ends of these rods are always in engagement with grooves 18 as shown in Figure 3 in which figure the rods 49 are shown in their retracted position.

Figure 2:
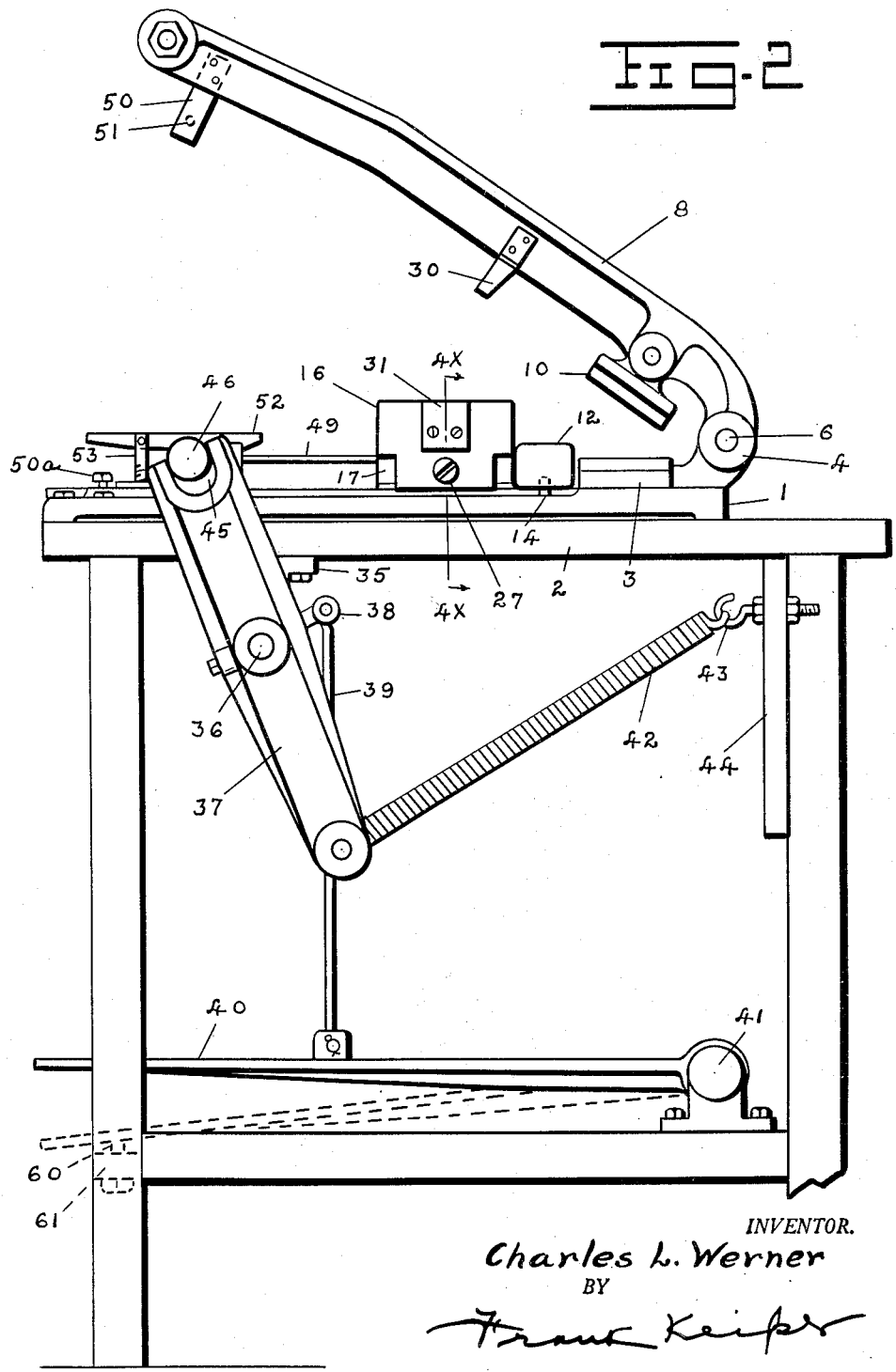
Figure 2 is a side elevation of the machine viewed from the right of Figure 1, the die being shown open, while in Figure 1 the die is shown in closed position.

It will be assumed that a strip of plastic candy has been placed between the two dies when in the position shown in Figure 2. The bar 11 and arms 8 and 9 are then brought down to the position shown in Figure 3. On the bar 9 is provided a plate 50 on which is provided a pin 51 which strikes a latch 52 pivoted on a stud 53 mounted on the base 1. This latch normally engages with the bar 48 and holds it in the retracted position shown in Figure 3. When the bar 11 descends, the latch 52 is raised to the position shown in Figure 3 and the bar 48 is released so that it can be moved forward by the operation of the pedal 40, crank 38 and arms 37 above described. The downward movement of the plate 50 is limited by a bolt 50a placed in the base 1 which bolt can be turned and adjusted up or down so as to stop the downward travel of the arms 8 and 9 and the upper die 10 in a predetermined position.

The rocking of the arms 37 pushes the bar 48 forward and each of the rods 49 is pushed forward and into engagement with the sticks 21 that are held in the grooves 18 in the platen 17 above described. The forward movement pushes the sticks into the holes 13 in the bar 12 and into the plastic candy in the molds while the candy is still hot and soft and as the candy is quickly cooled by the mold it freezes itself on the stick after which the bar 11 can be raised. This opens the molds after which the pick-up bar 12 can be lifted out carrying with it the sticks and the finished suckers.

For the purpose of guiding the bar 48 in its forward and back movement I provide tongues 55 fastened to the bar, which tongues slide in grooves 56 formed in the base 1. The forward movement of the bar 48 and tongues 55 and the treadle is limited by a bolt 60 in the crossbar 61 which bolt can be raised and lowered by turning it so as to fix the exact downward travel of the treadle 40. This determines the forward movement of the bar 48. The backward movement of the bar 48 is determined by the cover plates 62 and 63 placed above the tongues 55.

The complete operation of the machine will be described as follows:

The arms 8 and 9 are raised to a desired position as shown in Figure 2. A strip of plastic candy is placed between the dies 3 and 10 at a temperature of about 250° F. The arms 8 and 9 are then brought down causing the dies 3 and 10 to close and forming the candy suckers in the molds. At the same time the box 20 is moved sideways to insure the proper placing of the sticks 21 in each hopper and grooves 18. The treadle 40 is then pushed down causing the bar 48 and the rods 49 to be pushed forward, pushing the sticks 21 forward, one into each mold and into the plastic candy contained therein while hot and soft. The treadle is then released and raised, by the springs 42, withdrawing the rods 49 and permitting new sticks to drop into the grooves 18. The bar 11 is then raised, opening the molds. The pick-up bar 12 can then be lifted out with the suckers. The suckers and their sticks will then be shaken out from the bar 12 and the bar 12 can then be returned to its proper place in the machine and the above cycle of operations can then be repeated indefinitely making suckers in large quantities at low labor cost.

I claim:

1. In a machine for making candy suckers, the combination of means for forming a plurality of suckers arranged in a row, hoppers arranged in a row parallel thereto, said hoppers containing sticks on which the candy suckers are to be mounted, one hopper for each sucker, means for selecting one stick from each hopper, means for pushing the selected sticks endwise and simultaneously into the candy suckers, means located between the hoppers and the suckers for guiding each selected stick in its movement from its hopper to its candy sucker, said last named means remaining in engagement with the sticks after the sticks have engaged with the suckers and said means being removable from the machine and carrying with it both the sticks and the suckers.

2. In a machine for making candy suckers the combination of a die having molds therein for molding simultaneously a plurality of candy suckers, said molds being arranged in the die in a straight line, hoppers arranged in a row parallel to the die, said hoppers containing sticks on which the candy suckers are to be mounted, one hopper for each sucker mold, means for selecting one stick from each hopper, means for pushing the selected stick endwise and simultaneously into its mold and into the candy sucker contained therein.

3. In a machine for making candy suckers, the combination of a die having molds therein for molding simultaneously a plurality of candy suckers, said molds being arranged in the die in a straight line, hoppers arranged in a row parallel to the die, said hoppers containing sticks on which the candy suckers are to be mounted, one hopper for each sucker mold, a plate under the hoppers having one groove therein for each hopper, said grooves being adapted to receive one stick from its hopper, means for pushing the stick in each groove endwise and simultaneously out of its groove and into its mold and into the candy sucker contained therein.

4. In a machine for making candy suckers, the combination of a die having molds therein for molding simultaneously a plurality of candy suckers, said molds being arranged in the die in a straight line, hoppers arranged in a row parallel to the die, said hoppers containing sticks on which the candy suckers are to be mounted, one hopper for each sucker mold, a block placed below the hopper, said block having grooves therein, one for each hopper, means for moving the hoppers transversely on the block so that one stick will pass from each hopper into the groove in the block under the hopper.

5. In a machine for making candy suckers, the combination of a die having molds therein for molding simultaneously a plurality of candy suckers, said molds being arranged in the die in a straight line, hoppers arranged in a row parallel to the die, said hoppers containing sticks on which the candy suckers are to be mounted, one hopper for each sucker mold, a block placed below the hopper, said block having grooves therein, one for each hopper, means for moving the hoppers transversely on the block so that one stick will pass from each hopper into the groove in the block under the hopper, means for pushing the selected sticks in the grooves endwise and simultaneously into their molds and into the candy suckers contained therein.

6. In a machine for making candy suckers, the combination of a block having a series of parallel grooves therein, a frame containing a series of hoppers resting on said block, one hopper over each groove each hopper having an open bottom closed by the block and being adapted to hold sticks that rest directly on the block, means for moving the frame of the hoppers transversely on the block to permit one stick to fall from each hopper into the groove below it.

7. In a machine for making candy suckers, the combination of a die having molds therein for molding simultaneously a plurality of candy suckers, said molds being arranged in the die in a straight line, hoppers arranged in a row parallel to the die, said hoppers containing sticks on which the candy suckers are to be mounted, one hopper for each sucker mold, a block placed below the hopper, said block having grooves therein, one for each hopper, means for moving the hoppers transversely on the block so that one stick will pass from each hopper into the groove in the block under the hopper, a second block placed between the first-named block and the molds, said second block having a series of holes therethrough, one hole for each sucker, said holes being placed in line with the grooves in the block under the hopper, means for pushing the stick clear through and out of the groove which holds it and into engagement with the last named block and the suckers.

8. In a machine for making candy suckers, the combination of means for forming a plurality of suckers in a row, a block placed parallel to the means for molding the candy suckers, said block having holes passing through it, one for each sucker, a stationary block having grooves in the top thereof placed parallel to said first-named block, a third block placed parallel to said second named block and spaced away therefrom, said block having a series of rods thereon, one for each groove in the second named stationary block, means for moving the third named block so that the ends of the rods carried thereby pass through the grooves of the second named block and partially into the holes of the first-named block.

CHARLES L. WERNER.

REFERENCES CITED

The following references are of record in the file of this patent:

UNITED STATES PATENTS

| Number | Name | Date |
|---|---|---|
| 1,369,772 | Becker et al. | Mar. 1, 1921 |
| 1,425,998 | Morian | Aug. 15, 1922 |
| 1,756,375 | Million | Apr. 29, 1930 |
| 1,975,125 | Schmidt | Oct. 2, 1934 |

FOREIGN PATENTS

| Number | Country | Date |
|---|---|---|
| 598,264 | France | Dec. 12, 1925 |